(12) United States Patent
Sloane et al.

(10) Patent No.: US 11,429,972 B2
(45) Date of Patent: Aug. 30, 2022

(54) EDGE-NODE TOUCHLESS AUTHENTICATION ARCHITECTURE

(71) Applicant: Bank of America Corporation, Charlotte, NC (US)

(72) Inventors: Brandon Sloane, Charlotte, NC (US); Monika Kapur, Jacksonville, FL (US); Crystal M. Sundaramoorthy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 16/446,960

(22) Filed: Jun. 20, 2019

(65) Prior Publication Data
US 2020/0402052 A1  Dec. 24, 2020

(51) Int. Cl.
*G06Q 20/40* (2012.01)
*G06Q 20/10* (2012.01)
*H04L 9/40* (2022.01)

(52) U.S. Cl.
CPC ..... *G06Q 20/4014* (2013.01); *G06Q 20/1085* (2013.01); *H04L 63/0853* (2013.01); *H04L 63/107* (2013.01)

(58) Field of Classification Search
CPC .......... G06Q 20/4014; G06Q 20/1085; G06Q 20/10; G06Q 20/40; H04F 63/0853; H04F 63/107; H04L 63/0853; H04L 63/107; H04L 9/40
See application file for complete search history.

(56) References Cited

U.S. PATENT DOCUMENTS

| | | | |
|---|---|---|---|
| 7,539,856 B2 | 5/2009 | Buch et al. | |
| 8,243,596 B2 | 8/2012 | Fedders et al. | |
| 8,244,874 B1 | 8/2012 | Thireault | |
| 8,654,650 B1 * | 2/2014 | Vermeulen | G06F 9/526 370/241 |
| 9,419,960 B2 | 8/2016 | Bent et al. | |
| 9,900,725 B2 | 2/2018 | Young et al. | |
| 2015/0302411 A1 * | 10/2015 | Bondesen | G06Q 20/3224 705/72 |

(Continued)

OTHER PUBLICATIONS

"Anirudhan Adukkathayar, Secure Multifactor Authentication Payment System Using NFC, Jul. 24, 2015" (Year: 2015).*

(Continued)

*Primary Examiner* — Kenneth Bartley
*Assistant Examiner* — Gregory M James
(74) *Attorney, Agent, or Firm* — Weiss & Arons LLP

(57) ABSTRACT

This disclosure describes an edge-node computing system that provides streamlined access to secured products/services based on data captured by one or more sensors. The captured data may include unsolicited authenticators. Edge-nodes may process the captured data and perform a plurality of pre-authentication routines. A consensus protocol executed by the edge-nodes may establish a threshold pre-authentication of a customer based on the plurality of pre-authentication routines. Edge-nodes may configure an automated teller machine ("ATM") to provide the customer access to the ATM based on the threshold pre-authentication. The edge-nodes may configure the ATM to allow the customer to use a contactless authentication method to access the ATM.

15 Claims, 7 Drawing Sheets

(56) References Cited

U.S. PATENT DOCUMENTS

| | | | |
|---|---|---|---|
| 2016/0048816 A1* | 2/2016 | Friedman | G06Q 20/40 |
| | | | 705/43 |
| 2018/0121891 A1 | 5/2018 | Hosny et al. | |
| 2018/0167445 A1 | 6/2018 | Speight et al. | |
| 2018/0367314 A1 | 12/2018 | Egner et al. | |
| 2019/0026450 A1 | 1/2019 | Egner et al. | |
| 2020/0127812 A1* | 4/2020 | Schuler | H04L 63/0428 |

OTHER PUBLICATIONS

"Anirudhan Adukkathayar, Secure Multifactor Authentication Payment System Using NFC, Jul. 25, 2015, IEEE" (Year: 2015).*

Mary Shacklett, "Edge Computing: A Cheat Sheet," https://www.techrepublic.com/article/edge-computing-the-smart-persons-guide/, Jul. 21, 2017.

Paul Miller, "What is Edge Computing?" https://www.theverge.com/circuitbreaker/2018/5/7/17327584/edge-computing-cloud-google, May 7, 2018.

"What is Edge Computing," https://www.ge.com/digital/blog/what-edge-computing, GE Digital, Retrieved on May 16, 2019.

* cited by examiner

| Location | Transaction Method | Pre-authentication |
|---|---|---|
| 1 | Card Present Transaction | Known Payment Method<br>Known Location<br>Known Vendor |
| 2 | Mobile -NFC | Known Payment Method<br>Unknown Location<br>Known Vendor |
| 3 | Card Present Transcation | Known Payment Method<br>Unknown Location<br>Unknown Vendor |
| 4 | Customer Credentials | Known Device<br>Known Location |
| 5 | - | Known Location<br>Known Bioinformatics |
| 6 | Customer Credentials | Known Device<br>Unknown Location<br>Known Vendor |
| 7 | - | Known Location |

| | | |
|---|---|---|
| Consensus Protocol | ATM Cash Withdrawal @ Location 8 | Facial Recognition<br>No Card,<br>No PIN Required |

FIG. 5

EDGE-NODE TOUCHLESS AUTHENTICATION ARCHITECTURE

FIELD OF TECHNOLOGY

This application describes apparatus and methods for touchless authentication at a restricted resource using dispersed edge-node computing.

BACKGROUND

A merchant may provide customers with access to products and/or services (collectively, "products") offered by the merchant. A merchant may provide various access channels for customers to obtain products. For example, the merchant may provide access to products via an online web portal. The merchant may provide access to products via a mobile application. The merchant may provide access to products at brick and mortar locations.

Access channels utilized by the merchant may require a customer to authenticate themselves to access product offerings. For example, the merchant may be a financial institution that provides financial products. Such services may include financial advice and money management. To access a product and associated funds, the access channel may require authentication.

Exemplary authentication methods include presenting a tangible item, such as a debit or credit card. Authentication may include entering a passcode such as a personal identification number ("PIN") or social security number. For example, to access products provided by an automated teller machine ("ATM"), a customer may be required to present a tangible item and enter a passcode associated with the tangible item.

Thus, to access the ATM, the customer must take two steps. First, present the tangible item and second, enter the passcode. Two step or two factor authentication methods provide a threshold level of security to thwart unauthorized access to products. However, two factor authentication places a burden on the accessing customer.

The customer must possess the required tangible item. The customer must present the tangible item. Presenting the tangible item may include swiping a card through a card reader. The card must be properly positioned and the customer may need to swipe two or more times before the reader successfully recognizes the presented card.

Furthermore, the customer must then recall the passcode associated with the card. The customer must enter the passcode using a keypad. If the customer incorrectly enters the passcode, the customer may have to begin the authentication process over again.

Authenticators presented by a customer are verified. The authenticators may be verified by communicating with a cloud computing environment. The cloud computing environment may store known authenticators associated with a customer. In response to receiving a request to verify presented customer authenticators, the cloud computing environment may compare the presented authenticators to the known authenticators. When the presented and known authenticators match, the cloud computing environment may allow the customer to access a desired product.

However, communication with, and processing by, the cloud computing environment may inject additional latency before the customer is provided access to a product. Furthermore, communication with a cloud computing environment may expose presented authenticators to security threats. For example, transmitted authenticators may be vulnerable to being intercepted en-route to the cloud computing environment.

It would be desirable to provide less cumbersome authentication methods. It would be desirable to provide authentication methods that are less cumbersome and provide a threshold level of security to thwart unauthorized access to restricted products. Furthermore, it is desirable to provide authentication methods that harden the security of authenticators transmitted to a cloud computing environment. Accordingly it is desirable to provide apparatus and methods for an edge-node touchless authentication architecture.

BRIEF DESCRIPTION OF THE DRAWINGS

The features and advantages of the disclosure will be apparent upon consideration of the following detailed description, taken in conjunction with the accompanying drawings, in which like reference characters refer to like parts throughout, and in which:

FIG. 5 shows illustrative authenticators generated by the scenario shown in FIG. 4;

DETAILED DESCRIPTION

Figure 1:
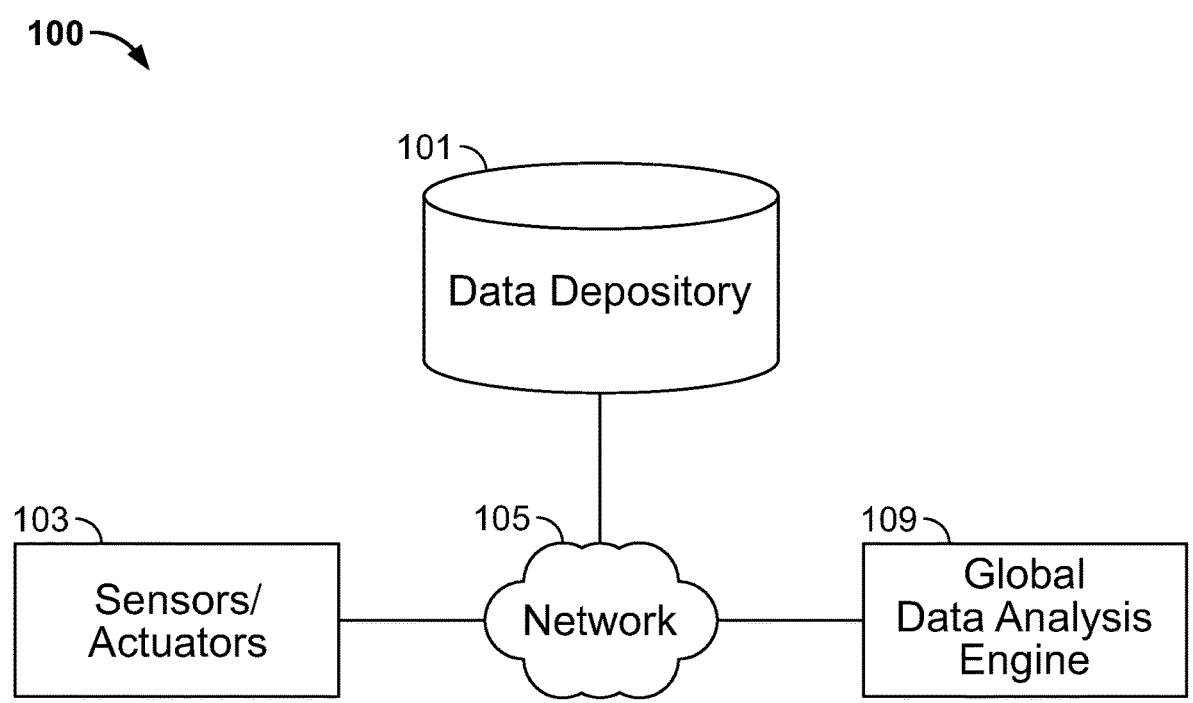
FIG. 1 shows an illustrative system in accordance with principles of the disclosure.

Apparatus and methods for edge-node controlled product access are provided. An edge-node may be a node on the periphery or edge of a network. An illustrative network may be an internet-of-things ("IoT") network. An IoT network may include one or more nodes. Each node may include two or more nodes.

A node may be a sensor. A sensor may detect changes in attributes of a physical or virtual operating environment. For example sensors may measure attributes such as audio, rainfall, movement, temperature, water levels or activity of other sensors. Sensors may measure electronic network traffic, customer access to products, authentication methods, electronic signals (e.g., input or output) or frequency of user logins from within a predefined geographic area.

Nodes may be any suitable size. For example, nodes may be a few millimeters in size. Nodes may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may be an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may move (translate, rotate, etc.) physical objects or activate/deactivate functionalities of physical objects. For example, actuators may dim a light bulb, open a door, change a temperature setting and/or any other suitable functionality. Actuators may include devices that modify a virtual state of information.

Within an IoT environment, sensor nodes may perform the functions of input devices—they serve as "eyes" collecting information about their native operating environment. In contrast, actuator nodes may act as "hands" implementing decisions based on data captured by the sensor nodes. A single node may include the functions of sensors and actuators.

Nodes may include an application programming interface ("API") for communicating with other nodes. Nodes may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators.

Nodes may store captured data locally. For example, nodes may store captured data in on-board transitory and/or non-transitory computer readable media. A node may transmit data. Data captured by a node may be transmitted to another node. A node may transmit data to a network core.

The network core may process the data. For example, multiple sensors may transmit captured data to a cloud computing environment. The cloud computing environment may itself include multiple nodes, such as computer servers or other computer systems. Nodes of the cloud computing environment may be networked to each other.

The cloud computing environment may process data that was captured by other nodes far from the location where the data was generated. For example, captured data may be transmitted from one node to another node until the captured data reaches a centrally located data depository.

Data captured by nodes in an operating environment may be voluminous and complex (e.g., structured/unstructured and/or constantly changing). Traditional data processing application software may be inadequate to meaningfully process the voluminous and complex data (e.g., "big data"). A cloud computing environment may include software applications specially designed to process large volumes of data ("big data analytics").

Nodes may communicate with other nodes directly, without transmitting information to an intermediary node or central server, such as a cloud computing environment. Data may be transmitted by a node using any suitable transmission method. For example, data captured by a node may be transmitted from a smartphone via a cellular network. Nodes may leverage a communication link provided by a smartphone to communicate captured data to other nodes.

As a result of the disparate nature of nodes, a networked operating environment may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell dry battery batteries (e.g., AA size) may provide a node with requisite computing power and wireless communication for many months.

A physical layer may link nodes within a network. The physical layer may provide data ports and communication pathways to move data between multiple sub-networks and nodes. Such communication pathways may be wired or wireless. Exemplary wireless communication pathways may include Ethernet, Bluetooth, Wi-Fi, 3G, 4G, 5G and any other suitable wired or wireless communication standards. Illustrative data ports of nodes may include hardware and/or software for receiving and/or transmitting data using any suitable communication pathway.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") address. Nodes may be identified based on a user. For example, a smartphone may be a node identified based on a user that successfully inputs biometric authenticators.

Nodes may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of data, or delivery of data to, any desired node.

For example, a location where data is captured may not have continuous, reliable network connectivity. Accordingly, captured data may be stored locally on a node until a network connection is available to transmit or broadcast the captured data to another node.

Nodes may be grouped. Nodes may be grouped based on physical proximity or based on the content (or expected content) of data captured by a node. Nodes may be grouped based on detected movement of a node. For example, nodes may be affixed to vehicles or other moveable objects. Such nodes may move in or out of a network. Nodes within a geographic area may be grouped based on their presence within the geographic area. Nodes may be grouped based on their expected trajectory. Nodes may be grouped based on whether they are resource consumers or providers. Nodes may be grouped based on expected resource consumption. Nodes may be grouped virtually. Grouped nodes may form a sub-network.

Contextually, data captured by nodes may provide information not only about the native (physical or virtual) operating environment surrounding a node, but data captured by multiple nodes may provide data that signifies occurrence an event. The data may be analyzed by a cloud computing environment. Analytical tools (e.g., big data analysis techniques) may detect, within the data, occurrence of an event that triggers actuator nodes to take responsive action.

Advances in embedded systems, such as System-on-a-Chip ("SoC") architectures, have fueled development of nodes that are powerful enough themselves to run operating systems and complex data analysis algorithms. An illustrative SoC may include a central processing unit ("CPU"), a graphics processor ("GPU"), memory, power management circuits, and communication circuit. Within an operating environment, such nodes may be positioned closer (relative to the cloud computing environment) to other data gathering nodes such as sensors. Nodes positioned close to the source of generated data and having sufficient computational power to process the data may be termed "edge-nodes." Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

For example, a sensor deployed on a windfarm turbine may detect changes in wind speed or wind direction. Typically, the sensor may transmit the detected changes to a remote cloud computing environment. The remote cloud computing environment may process data received from the node (and other nodes) and issue instructions to adjust a position of the turbine in response to the detected changes. However, communication with, and processing by, the cloud computing environment may inject additional latency before the turbines are adjusted in response to the sensed changes.

By running data analytics and processing closer to the originating source of data, actuator response times may be improved. Edge-nodes embedded in the turbine may include sufficient processing power to analyze sensed data and adjust turbines with less latency (perhaps even in close to real-time) and thereby optimize electricity production of the turbine.

In addition to providing faster response time to sensed changes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted en-route to the cloud computing environment. Processing data using an edge-node may reduce the number of data transmission to the cloud computing environment.

Additionally, edge-nodes may discard non-essential data generated by sensors. Such disregarded data may never be transmitted or stored in the cloud computing environment, further reducing exposure of such data to security threats and reducing bandwidth consumption across a network.

For example, network of security cameras (e.g., sensor nodes) may capture large amounts of video data. Transmitting large amounts of data to a cloud computing environment may utilize significant network bandwidth—possibly preventing the cloud computing environment from timely receiving other data. Edge-nodes may analyze captured video data before transmitting data to the cloud computing environment. Analysis by the edge-nodes may identify "important" video data. Only the important video data may be transmitted to the cloud computing environment, reducing network congestion.

Often instructions to actuators need to be issued in milliseconds or faster. Round-trip communication to a cloud computing environment introduces undesirable latency. For some applications, necessary reliability and critical-path control management make it undesirable to wait for the cloud computing environment to process data and issue responsive instructions.

For example, an anti-collision algorithm for an autonomous vehicle may be executed by the cloud computing environment. However, it would be faster and more reliable for such anti-collision algorithms to be run by edge-nodes. Furthermore, anti-collision data may only have short-term value. It would therefore be undesirable to regularly transmit such data to the cloud computing environment.

Some nodes may be deployed in areas with poor network connectivity. For example, industries such as mining, oil/gas, chemicals and shipping may not be well served by robust affordable communication infrastructure. Edge-nodes may allow networks associated with these industries to process data without robust communication infrastructure.

Edge-nodes may run encryption algorithms and store biometric or other known authenticators locally. Such dispersion of security protocols may reduce risk of known authenticators being comprised. For example, smartphones may not have dependable access to a data connection. A smartphone may be and edge-nodes that processes captured data. The smartphone may store known authenticators locally. The smartphone may include sensors configured to capture submitted authenticators. The smartphone may determine whether the submitted authenticators match the known authenticators.

An edge-node may synchronize changes with the cloud computing environment when a data connection is available. Aggregated sensor data may be transmitted to the cloud computing environment at designated times, such as when network bandwidth is underutilized.

Utilizing edge-nodes to process data may improve security of a network. For example, a network breach may be detected by an edge-node. The intrusion may be quarantined by or at the edge-node. Quarantining the breach may prevent a malicious actor from compromising the entire network.

Utilizing edge-nodes may disperse processing power needed to run the security or encryption algorithms. A software application may be run collectively by a group of edge-nodes. Collectively the group of edge-nodes may have a processing power comparable to processing power provided by a cloud computing environment.

Utilizing edge-nodes may improve reliability of a network. For example, edge-nodes with machine learning capabilities may detect operational degradation in nodes, equipment, and infrastructure deployed across an operating environment. Early detected degradation may be cured before developing into a full-blown failure.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

A edge-node may include one or more of the following components: I/O circuitry, which may include a transmitter device and a receiver device and may interface with fiber optic cable, coaxial cable, telephone lines, wireless devices, physical layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Edge-node components may be present on one or more circuit boards. In some embodiments, the components may be integrated into a single chip such as a SoC. The chip may be silicon-based.

An edge-node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The communication circuit may include the modem. The data port may include a communication circuit. An edge-node may include a modem, antenna or other communication circuitry for establishing communications over a network, such as the Internet. The communication circuit may include the network interface or adapter.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

An edge-node may include a display constructed using organic light emitting diode ("OLED") technology. OLED technology may enhance functionality of an edge-node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing edge-nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

Edge-nodes may include a battery. The battery may be a power source for electronic components of the edge-node. For example, the battery may supply power to the display, the communication circuit and the processor circuit. In some embodiments, an edge-node may include a plurality of batteries. Edge-nodes may include solar panels that convert solar energy into electricity that power one or more components of an edge-node.

An edge-node may receive/process data in real-time or at pre-defined intervals, such as once a day. The edge-node may filter data captured by one or more nodes. The edge-node may repackage or reformat captured data. Data conversion may include transformation of low level raw data (possibly from multiple sensors or groups of sensors) into meaningful information for a specific audience or for a specific analysis. For example, captured data intended for human consumption or interaction may be converted into a human understandable format. Captured data intended for machine consumption may be converted into a format readable by a particular machine or node.

An edge-node may perform pattern recognition to identify correlations and trends in captured data. The correlations and trends may indicate expected presence of a customer at an ATM or other customer authenticators. As used herein, an "authenticator" may refer to any and all information that may be used to authenticate a customer. For example, an authenticator may be characteristic activity of a customer or biometric features of the customer. Authenticating a customer may verify an identity of the customer and prevent another customer from accessing products associated with the customer.

The edge-node may evaluate a cost of obtaining authenticators. "Costs" may be monetary (e.g., labor costs or infrastructure costs), time-related or related to a level of intrusion needed to obtain desired authenticators. "Costs" may be bandwidth-related.

For example, data travelling within a network to/from nodes may be routed along multiple communication pathways until the transmitted information reaches a desired destination node (e.g., a cloud computing environment). Each communication pathway may service a number of connected nodes and a respective volume of informational traffic.

It may be difficult to ascertain available bandwidth on a particular communication pathway. It may be difficult to ascertain which communication pathways are being utilized to transmit information between nodes. Nodes attempting to transmit information over a communication pathway may not be aware of a number of connected nodes, a volume of traffic on a particular communication pathway or a bandwidth capacity of a communication pathway.

Furthermore, a communication pathway may be controlled by a different entity from an entity responsible for operation of a particular node. The entity responsible for operation of the node may be unable to monitor a number of nodes that share a communication pathway, a bandwidth capacity of a communication pathway or a volume of traffic transmitted on a communication pathway. Edge-node may be configured to manage data transmission of other nodes to reduce network congestion. For example, an edge-node may perform pattern recognition to estimate costs of obtaining data from a node on a network.

Edge-nodes may be configured to monitor customer activity. Customer activity may be detected based on unsolicited authenticators. Unsolicited authenticators may include authenticators gathered by edge-nodes that are not presented by the customer in response to a formal request for access to a product. Edge-nodes monitor customer activity by gathering data that includes video stream, routine customer movement, biometric data and customer geographic location. An edge-node may monitor customer use of functionality provided by the edge-node.

For example, a customer's smartphone may be an edge-node. The smartphone may monitor the customer device usage such as screen time, movement (e.g., via a pedometer or location sensor) or applications utilized. The smartphone may monitor submission of authenticators (e.g., biometric, passcodes) and successful authentications based on presented authenticators. For example, biometric authenticators may be required before the smartphone allows access to products or functionality. The smartphone may detect a threshold number of rejected authenticators.

An ATM may deny access to a customer in possession of a smartphone associated with a threshold number of rejected authenticators. The threshold number of rejected authenticators may indicate that the customer in possession of the smartphone may not be an authorized user of the smartphone.

Edge-nodes may monitor activity, such as movement, of the customer over a predefined time interval. Edge-nodes may monitor activity of the customer within a predefined geographic area. Edge-nodes may monitor activity of the customer using pedometer, gyroscope, accelerometer, location or other suitable sensors. Edge-nodes may formulate a virtual customer model based on the monitored customer activity. The virtual customer model may identify characteristic authenticators that define a customer.

Customer activity may include transaction behavior. Edge-nodes may monitor customer transaction behavior. Edge-nodes may formulate characteristic transactions associated with the customer. For example, the characteristic transactions may include utilizing specific merchant locations, at specific times to purchase specific products. Characteristic transactions may include use of a specific payment instrument or method used to pay for purchases.

Characteristic activity may include movement of a smartphone when paying for purchases. For example, a left-handed customer may handle a smartphone differently from a right-handed customer when moving the smartphone within range of a near field communication terminal. Handling a smartphone may include speed and/or rotation.

A virtual customer model may determine an authentication routine applied when a customer attempts to access a product. For example, the edge-nodes may monitor customer activity. Detected activity may indicate the customer is expected to access an ATM along a projected trajectory. The edge-nodes may determine when the customer is within a threshold distance of the ATM.

When the customer is within the threshold distance the ATM may activate a facial recognition sensor of the ATM. The ATM may itself be an edge-node and attempt to authenticate the customer based on facial recognition. The ATM may determine whether detected facial features correspond to known facial features associated with the virtual customer model. The ATM may correlate detected facial features to a stored image included on a customer's driver's license.

The ATM may attempt to self-authenticate the customer within a predetermined time interval. The predetermined interval may be defined by edge-nodes based on when the customer is expected to access the ATM along the projected trajectory. The ATM may only attempt to authenticate the customer when the customer is expected to be within the threshold distance of the ATM.

As the customer approaches the ATM (an edge-node), the ATM may communicate with the customer's smartphone (another edge-node). The ATM may determine whether a gait of the approaching customer corresponds to a known gait associated with the virtual customer model. A gait may be determined by a pedometer sensor of the smartphone.

The ATM may include motion sensors. The motion sensor may detect when a customer is in a position ready to access products provided by the ATM. A pressure sensor may detect when a customer is in a position ready to access products provided by the ATM. The pressure sensor may detect when the customer remains in the ready to access position for a threshold amount of time. The ATM may only provide access to an ATM product when a customer remains in the ready to access position for a threshold amount of time. The ATM may also require that the customer remain within a predetermined proximity of the ATM for a threshold amount of time before granting access to an ATM product. Such proximity and timing requirements may prevent a passing customer from inadvertently authenticating themselves at the ATM.

When the customer is in a ready to access position, the ATM may verify additional biometric authenticators of the customer. For example, the ATM may detect a height of the customer and correlate the detected height to the virtual customer model. The ATM may detect a weight of the customer. The ATM may perform a retina scan of the customer.

Based on a threshold number of successfully correlations between detected authenticators and the virtual customer model, the ATM may allow the customer in the ready to access position access to products provided by the ATM. Access to the products may be provided to the customer without the customer having to present a tangible item or enter a passcode. Access to the ATM products may be provided to the customer without the customer having presented any tangible items, touched or physically contacted the ATM.

In some embodiments, the ATM may continue to authenticate the customer while the customer is accessing products provided by the ATM. For example, the ATM may capture fingerprints of the customer as the customer navigates through products offered by the ATM. The captured fingerprints may be correlated to authenticators associated with the virtual customer model.

If at any time the ATM determines that the customer may be provided access to unauthorized products, the ATM may terminate access of the customer. Edge-nodes may continue to monitor activity of the customer after the customer leaves the ATM.

For example, the edge-nodes may monitor movement, transactions and other activity of the customer after accessing the ATM. If the subsequent activity deviates from the virtual customer model, edge-nodes may take remedial action. Remedial action may include requiring the customer to perform a conventional two-factor authentication before accessing a product.

Apparatus for a self-authenticating system is provided. The system may self-authenticate a customer before providing access to a product. The product may be services provided by an ATM. The system may include a plurality of edge-nodes. Each of the edge-nodes may be configured to perform a pre-authentication routine. The pre-authentication routine may be performed based on unsolicited authenticators of a customer. Unsolicited authenticators may include authenticators gathered by edge-nodes that are not presented by the customer in response to a formal request for authentication.

Edge-nodes may gather authenticators that include video stream data, routine customer movement, biometric data and customer geographic location and data associated with other activities without formally requesting the customer present this captured data for authentication purposes.

For example, a customer's smartphone may be an edge-node. The smartphone may monitor customer usage of the smartphone such as screen time or applications utilized. The smartphone may monitor successful validation of biometric authenticators processed by the smartphone. Biometric authenticators may be required before the smartphone allows access to services or functionality it provides. The smartphone may detect a threshold number of rejected biometric authenticators.

Other edge-nodes may be configured to capture unsolicited customer authenticators. For example, an image of the customer may be captured by a security camera. A merchant point-of-sale terminal may capture a transaction initiated with the customer. A transaction may indicate the customer is at a particular location.

A consensus protocol may be configured to establish a threshold pre-authentication of the customer based on the plurality of pre-authentication routines. The plurality of pre-authentication routines may be performed by multiple edge-nodes. Each edge-node may capture one or more authenticators. Each edge-node may perform a pre-authentication routine by determining whether the captured authenticators correlate to historical authenticators captured by the edge-node. Each edge-node may perform a pre-authentication routine by determining whether the captured authenticators correlate to authenticators associated with a virtual customer model.

Illustrative consensus protocols may include a proof of work protocol, a proof of stake protocol, a delegated proof of stake protocol, a transaction as proof of stake protocol and a delegated byzantine fault tolerance protocol. Illustrative consensus protocols may include a stake weighted voting scheme. In a stake weighted scheme, not all edge-nodes have the same amount of influence over an authentication decision. For example, trusted edge-nodes may have more voting power than other edge-nodes. Trust may be established based on successful validation of conventional two-factor authentications, number of authentications or types of authenticators validated by an edge-node. Edge-nodes that successfully validate a biometric authenticator may be assigned more trust than an edge-node that monitors movement of a customer. Any suitable consensus protocol may be utilized.

An edge-node may be an ATM. The ATM may be configured to provide the customer access to an ATM product or service based on a threshold pre-authentication. The ATM may be further configured to generate a real-time authentication routine based on the threshold pre-authentication.

The real-time authentication routine may authenticate a customer when the customer is within a predetermined distance of the ATM. The ATM may include one or more sensors for detecting a presence of the customer within the predetermined distance. The predetermined distance may correspond to detecting that the customer is in a ready to access position for a product provided by the ATM. The real-time authentication routine may include authentication by the ATM. Such authentication may include facial recognition or validation of other biometric authenticators.

An ATM product may be a first ATM product. The ATM may execute the real-time authentication routine before providing the customer access to a second ATM product. The ATM may provide the customer access to a first ATM product based on the pre-authentication routines and the threshold pre-authentication. The second product may be a product, that if provided to an unauthorized customer may have greater consequences than unauthorized access to the first product. For example, the first ATM product may include providing information, such as account balances. The second ATM product may include allowing actions, such as cash withdrawals or purchases that debit an account balance.

An authentication method and associated authenticators required before providing access to a product may be correlated to a degree of trustworthiness provided by the authentication method and associated authenticators. For example, the ATM may require a real-time authentication routine based on solicited authenticators before granting access to a second ATM product.

The ATM may be configured to detect a presence of the customer within a predetermined distance of the ATM. A real-time authentication routine may be a contactless authentication routine. Contactless authentication may include authentication that does not require touching or contacting an ATM component. For example, the ATM may communicate with the customer's smartphone. The ATM may determine whether an authenticator, such as a gait of the customer captured by the smartphone, corresponds to a known gait associated with a virtual customer model. A gait may be determined by a pedometer or other sensors embedded in the smartphone.

The ATM may include motion sensors. The motion sensor may detect when a customer is in a position, relative to the ATM, ready to access products provided by the ATM. A pressure sensor may detect when a customer is in a ready to access position. When the customer is in the ready to access position, the ATM may verify additional biometric authenticators of the customer.

The ATM may provide access to the second product by executing a contactless authentication routine. A contactless authentication routine may include recognition of biometric authenticators without the customer touching an ATM component. A contactless authentication routine may include confirming that authenticators captured by a smartphone in possession of the customer conform to authenticators associated with a virtual customer model.

The ATM may provide access to the second product when the contactless authentication routine is executed within a predetermined time window. The predetermined time window may be based on the predetermined distance. For example, edge-nodes may detect a customer en-route to an ATM. The edge-nodes may calculate a time window needed for the customer to reach the ATM. The time estimate may take account of traffic conditions, other customers waiting to use the ATM or other factors that may impact when the customer will arrive at the ATM.

Based on the time window, the ATM may allow the customer to access the ATM if a contactless authentication routine is success executed when the customer is expected to arrive at the ATM. In some embodiments, access to the ATM may be provided if the contactless authentication routine is executed within a buffer window of when the customer is expected to arrive at the ATM. The buffer window may be one, two or five minutes before or after the expected arrival time. The buffer window may fluctuate based on the product desired by the customer.

Based on the threshold pre-authentication the ATM may be configured to determine a service level applied to an ATM session. The ATM may provide the customer access to the ATM that is limited by the service level.

For example, if the pre-authentication is based on a relatively deep data pool of captured authenticators, the service level may allow the customer access to comparatively more products with greater potential consequences. If the pre-authentication is based on a relatively shallow data pool of captured authenticators, the service level may limit customer access to comparatively less products. Relative depth of data pool may be determined based on comparing data pools of authenticators captured from a plurality of customers. In some embodiments, a cloud computing environment may determine depth of captured authenticators.

A least one edge-node may be configured to determine a desired ATM product before the customer accesses the ATM. The edge-node may determine the desired ATM product based on prior ATM products accessed by the customer. The ATM may be further configured, based on the desired ATM product and the threshold pre-authentication, to generate a real-time authentication routine. The real-time authentication routine may be communicated to the customer. The real-time authentication routine may be provided to the customer via an edge-node, such as a smartphone. The customer may provide authenticators responsive to the real-time authentication method before the customer arrives at the ATM.

The ATM may detect a presence of the customer at the ATM. For example, the ATM may monitor movement of customer. The ATM may track movement of the customer after receiving authenticators responsive to the real-time authentication method. The ATM may detect a presence of the customer at the ATM using a contactless authentication routine. In response to detecting the presence of the customer at the ATM, the ATM may provide the customer access to the desired ATM product.

The plurality of edge-nodes may be configured to establish a threshold pre-authentication based on a threshold number of successful validations of customer authenticators. Confirmation of customer authenticators may provide authentication of the customer. Each authenticator confirmation may be performed by a different edge-node. A consensus protocol may allow each edge-node to track a total number of successful authenticator confirmations.

Illustrative authenticator confirmations may include facial recognition scans, fingerprint recognition scans or successful recognition of other biometric authenticators. Illustrative authenticator confirmations may include geographic location correlations.

A geographic location correlation may include determining that a customer is located within a geographic area at a time when, historically, the customer has been located within the geographic area at the specified time. For example, the geographic location correlation may correspond to determining that customer is at a work location during working hours (e.g., 9 am-5 pm). The geographic location correlation may correspond to determining that customer is at a home location during evening or early morning hours.

Illustrative authenticator confirmations may be based on transactional activity. Patterns in transaction activity of a customer may indicate locations expected to be visited by the customer and products expected to be purchased by the customer. Transaction activity that fits the pattern may provide confirmation of customer authenticators.

Computing power for executing the consensus protocol may be provided by a plurality of edge-nodes. In some embodiments, the plurality of edge-nodes may execute a distributed protocol that requires the collective computing resources of a plurality of edge-nodes. In some embodiments, each edge-node may determine whether collective customer authenticator confirmations by one or more other edge-nodes are sufficient to provide a level of authentication needed to provide access to a product, such as an ATM.

Methods for self-authenticating a customer are provided. Methods may include self-authenticating the customer at an ATM. The method may include using a plurality of edge-nodes, performing a plurality of pre-authentication routines based on unsolicited authenticators of a customer. After performing the plurality of pre-authentication routines, methods may include executing a consensus protocol. The consensus protocol may establish a threshold service level provided to the customer based on the pre-authentication routines. The consensus protocol may establish an abbreviated real-time authentication routine for the customer.

The abbreviated real-time authentication routine may include contactless authentication of a sensed biometric authenticator. For example, the abbreviated real-time authentication routine may include facial recognition. The abbreviated real-time authentication routine may not require a customer to present a tangible item or enter a PIN to access the ATM.

The plurality of pre-authentication routines may provide a first authentication factor. The abbreviated real-time authentication routine may provide a second authentication factor. In response to receiving authenticators responsive to the abbreviated real-time authentication routine, methods may include providing the customer access to the ATM at the threshold service level.

Customer authenticator confirmations may be submitted to a cloud computing environment. In some embodiments, the cloud computing environment may provide computing power for executing a consensus protocol to determine the threshold service level and abbreviated real-time authentication routine.

The cloud computing environment may perform its own analysis of authenticator confirmations. The cloud computing environment may conduct its analysis in tandem with analysis performed by one or more edge-nodes. The cloud computing environment may conduct its analysis after analysis performed by one or more edge-nodes. If the analysis of the cloud computing environment is unable to authenticate the customer, the cloud computing environment may instruct an edge-node, such as an ATM, to deny access to the customer unless a conventional two-factor authentication is provided.

Methods may include, using a cloud computing environment, determining a virtual customer model based on a first plurality of pre-authentication routines. The first plurality of pre-authentication routines may include monitoring and confirming one or more customer authenticators. The virtual customer model may include characteristic authenticators that define the customer. The characteristic authenticators may be confirmed by one or more pre-authentication routines.

Methods may include executing a consensus protocol that determines whether a second plurality of pre-authentication routines verify authenticators that conform to the virtual customer model. The second plurality of pre-authentication routines may attempt to confirm customer authenticators that have not yet been successfully confirmed by the first plurality of pre-authentication routines.

Methods may include recording a result of each pre-authentication routine in a distributed ledger. A result of a pre-authentication routine may correspond to a confirmation that a sensed customer authenticator conforms to a known authenticator or known activity pattern associated with the customer. A result of a pre-authentication routine may correspond to a discrepancy between a sensed customer authenticator and a known authenticator or known activity pattern associated with the customer. Detection of a discrepancy or a threshold number of discrepancies may prevent a customer from accessing a product using self-authentication or contactless authentication methods.

A self-authenticating ATM system is provided. The system may include an ATM. The ATM may be configured to provide a customer initial access to an ATM service based on a two-factor real-time authentication routine. The two-factor real-time authentication routine may be a conventional two-factor authentication method. An exemplary conventional two-factor authentication method may include presenting a tangible item and entering a passcode. An exemplary conventional two-factor authentication method may include presenting a biometric feature and entering a passcode.

The ATM may capture unsolicited authenticators of a customer. For example, the ATM may capture the unsolicited authenticator while the customer is using the ATM. Illustrative unsolicited authenticators may include biometric features, such as facial recognition, fingerprint recognition and body movement. Illustrative unsolicited authenticators may be obtained from a mobile device of the customer. The mobile device, such as a smartphone, may include tracked biometric features such as pedometer data and geographic location data.

The ATM may attempt to determine if unsolicited authenticators it captures correspond to unsolicited authenticators captured by the customer's smartphone. The ATM may attempt to determine if unsolicited authenticators it captures correspond to customer authenticators stored in a cloud computing environment. For example, the ATM may determine whether recognition of facial features correspond to facial features associated with an image on the customer's driver's license stored in the cloud computing environment or on a mobile device.

The system may include one or more edge-nodes that are configured to capture and/or confirm customer authenticators. Illustrative edge-nodes may include a mobile device such as a smartphone. Illustrative edge-nodes may include merchant POS systems and associated components thereof. Illustrative edge-nodes may include payment instruments. Illustrative edge-nodes may include any suitable edge-node.

The plurality of edge-nodes may be configured to perform a plurality of pre-authentication routines. The ATM may generate a plurality of pre-authentication routines based on the captured unsolicited authenticators. The plurality of pre-authentication routines may be configured to confirm the customer authenticators captured by the ATM. Edge-nodes may perform the pre-authentication routines by independently capturing and validating authenticators of the customer. Each of the plurality of edge-nodes may be configured to determine whether captured authenticators conform to the authenticators captured by the ATM. Each of the plurality of edge-nodes may be configured to attempt to capture and independently verify one or more of the authenticators captured by the ATM.

The system may include a cloud computing environment. The cloud computing environment may be configured to validate a threshold number of pre-authentication routines performed by the plurality of edge-nodes. In response to validating the threshold number of pre-authentication routines, the cloud computing environment may reconfigure the ATM to provide the customer access to the ATM based on a single-factor authentication routine. Validating a pre-authentication routine may include validating captured authenticators. Captured authenticators may be validated by comparing the captured authenticators to known authenticators or know authenticator patterns (e.g., customer activity).

The cloud computing environment may be configured to generate a virtual customer model. The virtual customer model may be generated based on the authenticators captured by the ATM and/or other edge-nodes. The virtual customer model may be generated based on patterns in the captured customer authenticators. The patterns may be detected by applying machine learning algorithms to captured authenticators. The virtual customer model may be generated based on authenticators submitted by the customer to the cloud computing environment.

The cloud computing environment may configure one or more of the edge-nodes to perform one or more pre-authentication routines. A pre-authentication routine may confirm authenticators associated with a virtual customer model. A pre-authentication routine may validate that authenticators captured by the edge-nodes conform to the authenticators associated with the virtual customer model and thereby validate the virtual customer model.

In some embodiments, the cloud computing environment may be configured to generate a virtual customer model based on unsolicited authenticators captured by the ATM or other edge-nodes. The cloud computing environment may validate one or more pre-authentication routines generated by the ATM. The cloud computing environment may validate the pre-authentication routines generated by the ATM based on whether authenticators authenticated by the pre-authentication routine conform to authenticators associated with the virtual customer model.

For example, when a customer attempts to access an ATM, the ATM may capture a set of biometric authenticators. The set of authenticators may form a pre-authentication routine. The cloud computing environment may validate the pre-authentication routine by determining whether the biometric authenticators captured by the ATM correspond to authenticators associated with the virtual customer model. The virtual customer model may be generated by the cloud computing environment based on customer authenticators captured by other edge-nodes or provided by the customer.

The cloud computing environment may be configured to validate a pre-authentication routine based on a consensus protocol running on each of the plurality of edge-nodes. Each of the edge-nodes may be configured to capture one or more authenticators and determine whether the captured authenticators are associated with the customer. The cloud computing environment may run a consensus protocol that governs decision making among a decentralized peer-to-peer system, such as nodes on an IoT network. The consensus protocol may determine whether one or more captured authenticators provide sufficient authentication to allow the customer access to a product.

Illustrative consensus protocols may include a proof of work protocol, a proof of stake protocol, a delegated proof of stake protocol, a transaction as proof of stake protocol and a delegated byzantine fault tolerance protocol. Any suitable consensus protocol may be utilized.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system architecture 100. Architecture 100 may represent an illustrative IoT network. Architecture 100 may include one or more nodes. Each node may include two or more nodes. Nodes may be linked to each other via network 105. FIG. 1 shows exemplary nodes 103 that include sensors and actuators. Nodes 103 may communicate with data analysis engine 109 and data depository 101. Data analysis engine 109 and data depository 101 may be included in a cloud computing environment.

A cloud computing environment may leverage data analysis engine 109 and data depository 101 to validate captured authenticators and associated pre-authentication routines. Cloud computing environment may leverage data analysis engine 109 and data depository 101 to reconfigure an ATM to implement a touchless or contactless authentication routine.

Sensors may include devices that detect changes in a physical or virtual environment. Sensors may measure changes in their native (physical or virtual) environment, capture data corresponding to the measured changes and store/communicate the captured data. Authenticators may be captured by sensors. Sensors may be accessed by other sensors or other network nodes. Sensors may transmit captured data to another node. Sensors may be included in edge-nodes such as an ATM or customer mobile device.

Actuators may respond to data transmitted or processed by other nodes, such as data analysis engine 109. Actuators may include devices that modify the physical state of a physical entity. Actuators may include devices that modify a virtual state of information. Actuators may move (translate, rotate, etc.) physical objects or activate/deactivate functionalities of physical objects. For example, actuators may dim a light bulb, open a door, change a temperature setting, move objects, allow access to ATM services and/or any other suitable functionality. A single node may include the functions of sensors and actuators.

Generally, nodes on a network may interact and cooperate using one or more interaction paradigms. Exemplary interaction paradigms include master-slave, client-server and peer-to-peer interactions. As a result of the disparate nature of nodes 103, system architectures, such as architecture 100 incorporating nodes 103 may support a variety of communication protocols.

Nodes 103 may be produced by different manufacturers. Nodes 103 may capture data in different formats. For example, nodes 103 may use different data structures to store captured data. Nodes 103 may utilize different communication protocols to transmit captured data or communicate with other nodes. Despite such operational differences, nodes 103 may be configured to operate substantially seamlessly together.

Nodes 103 may belong to, or be operated by, different administrative/management domains. Nodes 103 may be operated by different domains without expressly-defined relationships among such domains. One of nodes 103 may control data gathering or actuation of another of nodes 103. Interoperability of nodes 103 may allow captured data to be substantially seamlessly captured and interpreted by data analysis engine 109 (or other nodes). Based on interpreting the captured data, data analysis engine 109 may issue instructions to nodes 103.

Data gathering by one or more of nodes 103 may be controlled by one or more other nodes. For example, data analysis engine 109 may control a quantity and/or quantity of data captured by nodes 103. Data depository 101 and/or analysis engine 109 may filter or otherwise intelligently process data captured by nodes 103. For example, data analysis engine 109 may validate authenticators sensed by nodes 103 by determining whether captured authenticators match authenticators stored in data depository 101.

Timing of when data is captured by nodes 103 may be controlled by any suitable node of architecture 100. For example, authenticators may be captured in real-time or at pre-defined intervals such as once a day. Authenticators may also be captured in response to a detected environmental status change, such a weather pattern, movement or news events.

Data analysis engine 109 may repackage or reformat captured data. Data conversion may include transformation of low level raw data (possibly from multiple sensors or groups of sensors) into meaningful information for a specific audience or for a specific analysis.

Data depository 101 may receive data captured by nodes 103. Data stored in depository 101 may be sorted and analyzed by data analysis engine 109. Data analysis engine 109 may perform pattern recognition on data stored in data depository 101. Data analysis engine 109 may identify correlations and trends in captured data. Illustrative patterns may include validating a threshold number of pre-authentication routines and associated authenticators. In some embodiments, data captured by nodes 103 may be transmitted directly to data analysis engine 109.

Data stored in data depository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may generate a virtual customer model, validate the virtual customer model, configure edge-nodes to perform the plurality of pre-authentication routines or detect a presence of a customer within a predetermined distance of an ATM.

Architecture 100 may include one or more layers of software applications. Software applications may implement a variety of functions and provide varied services to nodes of architecture 100. Software applications running on data analysis engine 109 may submit requests to nodes 103 for retrieval of specific data to achieve a functional goal. Software applications may control data captured by nodes 103 or actions taken by nodes 103. Software applications may provide security services that mitigate threats to the integrity of data transmitted or stored by sensors 103 or architecture 100 generally.

Nodes 103 positioned relatively close to a source of captured data and having sufficient computational power to process captured data may be termed "edge-nodes." Edge-nodes may integrate sensing capabilities, actuating capabilities, data connectivity and/or computing capacities. Edge-nodes may control sensors, actuators, embedded devices and other nodes. Edge-nodes, or the nodes they control, may not be continuously connected to a network. Edge-nodes may provide increased computational resources positioned near the source of captured data. Processing data using edge-nodes may reduce communication bandwidth needed to transmit captured data from a node to a cloud computing environment for processing.

Nodes 103 may be grouped. Nodes may be grouped based on physical proximity or based on proximity to an edge-node. Nodes may be grouped based on capturing related authenticators or customer activity. Authenticators may be related based on whether they are expected to be captured within predetermined time, within a predetermined distance of each other or as a result of an activity. An edge-node may create and/or be included in a node group. An edge-node may manage and coordinate inter-node communications for members of a node group.

Figure 2:
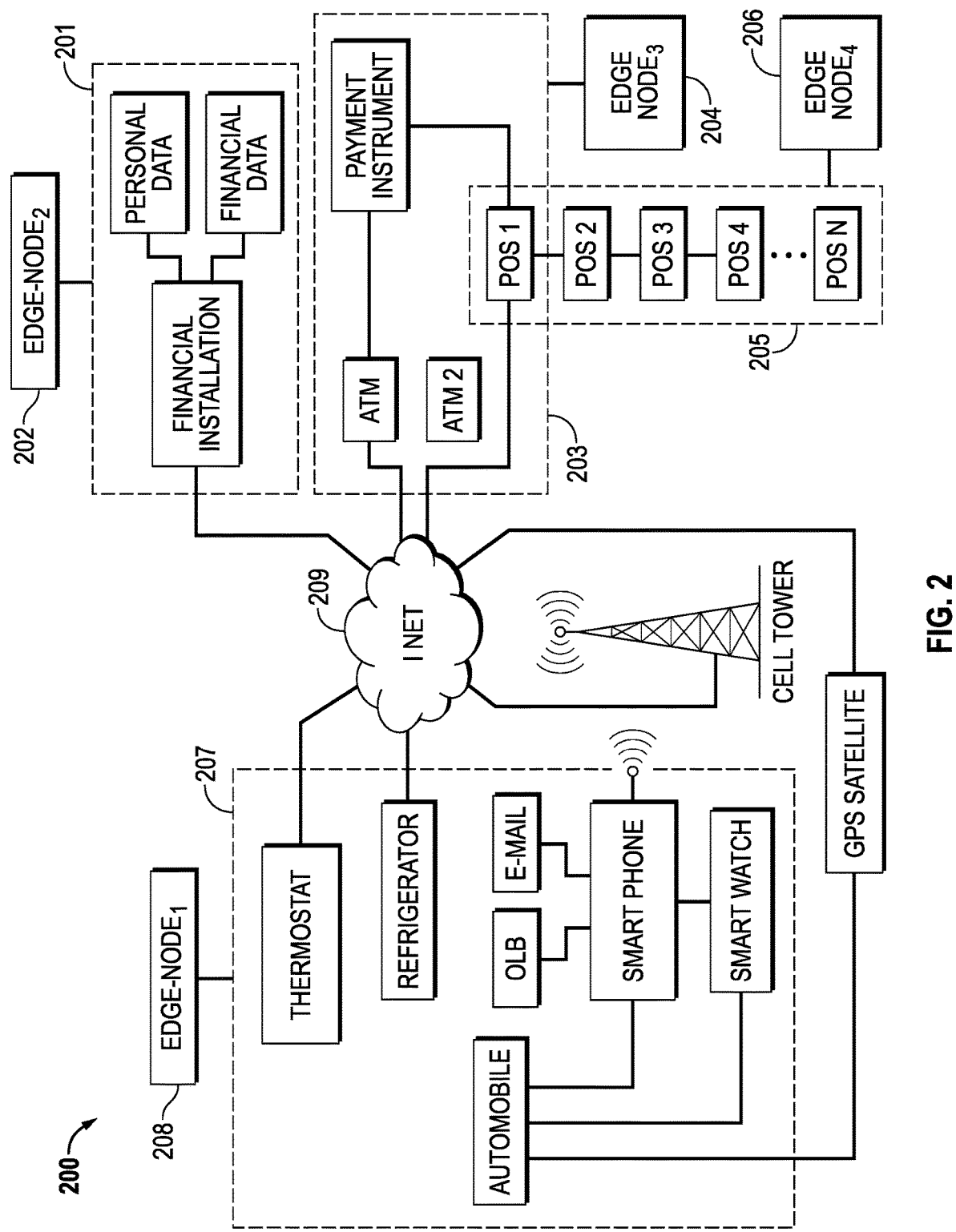
FIG. 2 shows an illustrative system in accordance with principles of the disclosure.

FIG. 2 shows illustrative node groups 200. Edge-node 208 is associated with group 207. Edge-node 208 may facilitate communication among nodes of group 207. Edge-node 208 may facilitate secure communication among nodes of group 207. Edge-node 208 may process data gathered by nodes in group 207. For example, edge-node 208 may perform a plurality of pre-authentication routines based on unsolicited authenticators captured by nodes of group 207. Based on data sensed by group 207, edge-node 208 may authenticate a customer and determine that a customer is within a predetermined distance of an ATM or banking center.

Edge-node 202 is associated with group 201. Edge-node 202 may facilitate communication among nodes of group 201. Edge-node 202 may facilitate secure communication among nodes of group 201. Edge-node 202 may process data gathered by nodes in group 201. For example, edge-node 202 may perform a plurality of pre-authentication routines based on unsolicited authenticators captured by nodes of group 201. Based on data sensed by group 201, edge-node 202 may authenticate a customer and determine that the customer is within a predetermined distance of an ATM or banking center.

Edge-node 204 is associated with group 203. Edge-node 204 may facilitate communication among nodes of group 203. Edge-node 204 may facilitate secure communication among nodes of group 203. Edge-node 204 may process data gathered by nodes in group 203. For example, edge-node 204 may perform a plurality of pre-authentication routines based on unsolicited authenticators captured by nodes within group 203. Based on data sensed by group 203, edge-node 204 may authenticate a customer and determine that a customer is within a predetermined distance of an ATM or banking center.

Edge-node 206 is associated with group 205. Edge-node 206 may facilitate communication among nodes of group 205. Edge-node 206 may facilitate secure communication among nodes of group 205. Edge-node 206 may process data gathered by nodes in group 205. For example, edge-node 206 may perform a plurality of pre-authentication routines based on unsolicited authenticators captured by nodes within group 205. Based on data sensed by group 205, edge-node 206 may determine that a customer is within a predetermined distance of an ATM or banking center.

Data, such as authenticators, captured by nodes in group 207 may be used by nodes in groups 207, 205, 203 or 201. For example, data gathered by nodes in group 207 may indicate an expected trajectory of a customer or a current location of a customer. Such data may be used by sensors in groups 201, 203, 207 or 205 to perform a pre- or real-time authentication routine or validate authenticators associated with a virtual customer model. Unsolicited authenticators captured by sensors in group 201 or 203 may be used by edge-nodes 208 and 206.

A consensus protocol executed by edge-nodes 208, 202, 204 and 206 may coordinate analysis of data captured by groups 207, 201, 203 and 205. Nodes groups and associated edge-nodes may communicate with each other via central network 209. An edge-nodes may directly communicate (e.g., bypassing network 209) with nodes in its group and/or with one or more nodes of another group.

Nodes may be grouped based on "closeness." "Closeness" may be defined based on geographic proximity. "Closeness" may be defined based on a length of a communication pathway (physical or virtual) that connects a node and an edge-node. "Closeness" may be defined based on a length of a communication pathway (physical or virtual) that connects a node and an edge-node. "Closeness" may be defined based on related functionality.

A length of a communication pathway may be defined based on a number of intermediary nodes between a node and an edge-node. A length of a communication pathway may be defined based on distance physically separating a node from an edge-node.

Figure 3:
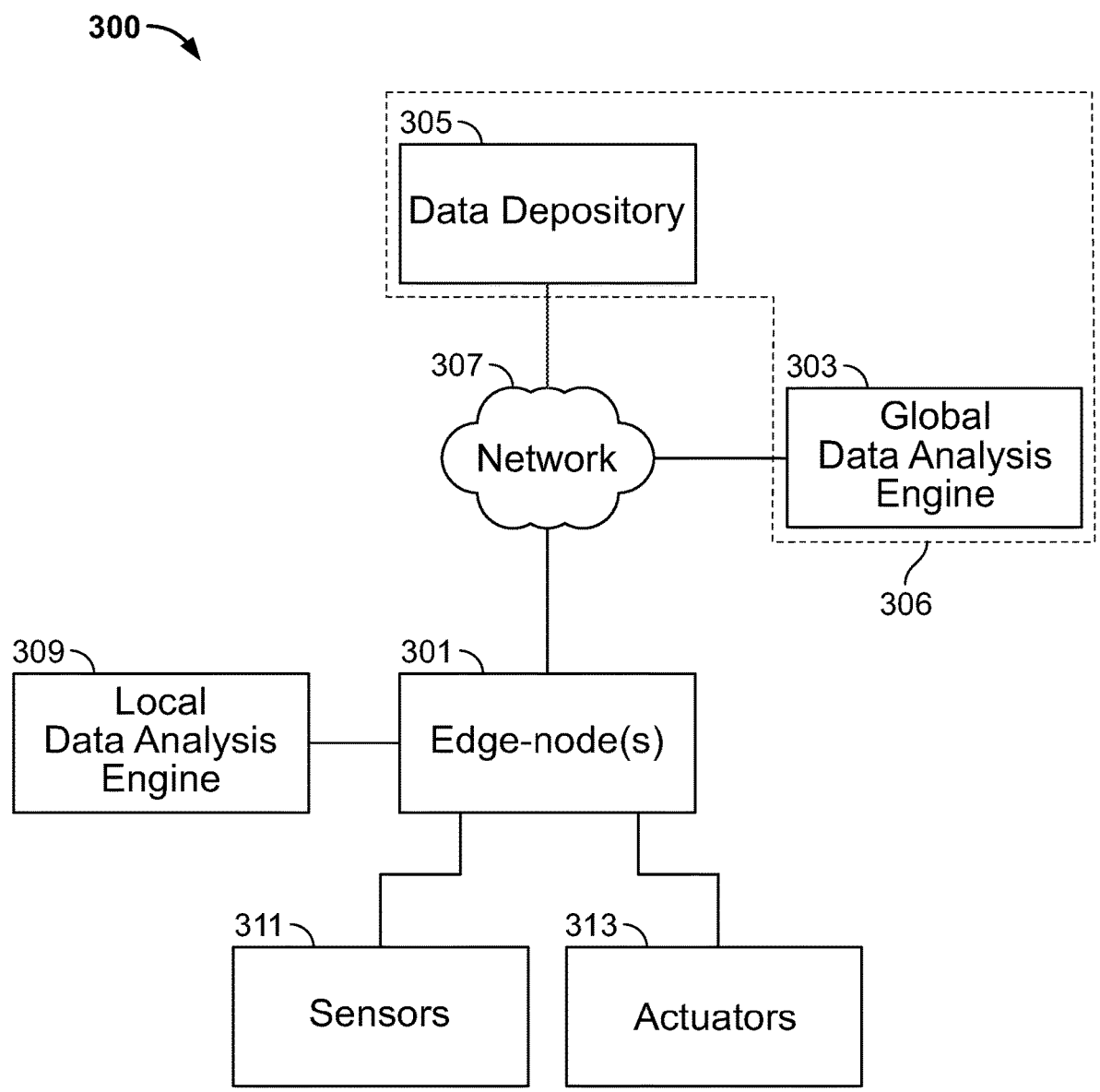
FIG. 3 shows an illustrative system in accordance with principles of the disclosure.

FIG. 3 shows illustrative system architecture 300. System 300 includes data depository 305 and global data analysis engine 303. Data depository 305 and global data analysis engine 303 may be provided by cloud computing environment 306. Data depository 305 may store data captured by sensors 311 and generated by actuators 313.

System 300 includes edge-node(s) 301. Edges-node(s) 301 may be configured to receive data from sensors 311 and issue instructions to actuators 313. Illustrative sensors 311 may include sensors that capture authenticators such as geographic location, biometric features (e.g., facial recognition, retina scan, fingerprint information) or transactional activity.

Edge-node(s) 301 may process data captured by sensors 311 using local data analysis engine 309. For example, edge-node(s) 301 may perform a plurality of pre-authentication routines by validating unsolicited authenticators captured by sensors 311. Based on data captured by sensors 311, edge-node(s) 301 may be configured to determine an ATM product desired by a customer. Based on data captured by sensors 311, edge-node(s) 301 may be configured to establish a threshold pre-authentication of the customer. Edge-node(s) 301 may generate a virtual customer model based on unsolicited authenticators captured by sensors 311.

Edge-node(s) 301 may issue instructions to actuators 313. The instructions may include reconfiguring an ATM to implement a contactless authentication routine. The instructions may include reconfiguring an ATM to provide a product to a customer based on the contactless authentication routine.

In some embodiments, cloud computing environment 306 may periodically validate authentication routines and ATM access rights provided by edge-node(s) 301. In some embodiments, cloud computing environment 306 may execute a consensus protocol that coordinates data analysis performed by edge-node(s) 301. Cloud computing environment 306 may communicate with edge-node(s) 301 using network 307.

Cloud computing environment 306 may leverage data analysis engine 303, data depository 305 and data processing results of edge-node(s) 301 to validate pre-authentication routines performed by edge-node(s) 301. Cloud computing environment 306 may reconfigure an ATM to provide customer access to the ATM based on a single-factor authentication routine. Based on pre-authentication routines performed by edge-nodes, cloud computing environment 306 may determine a service level applied to an ATM session.

Figure 4:
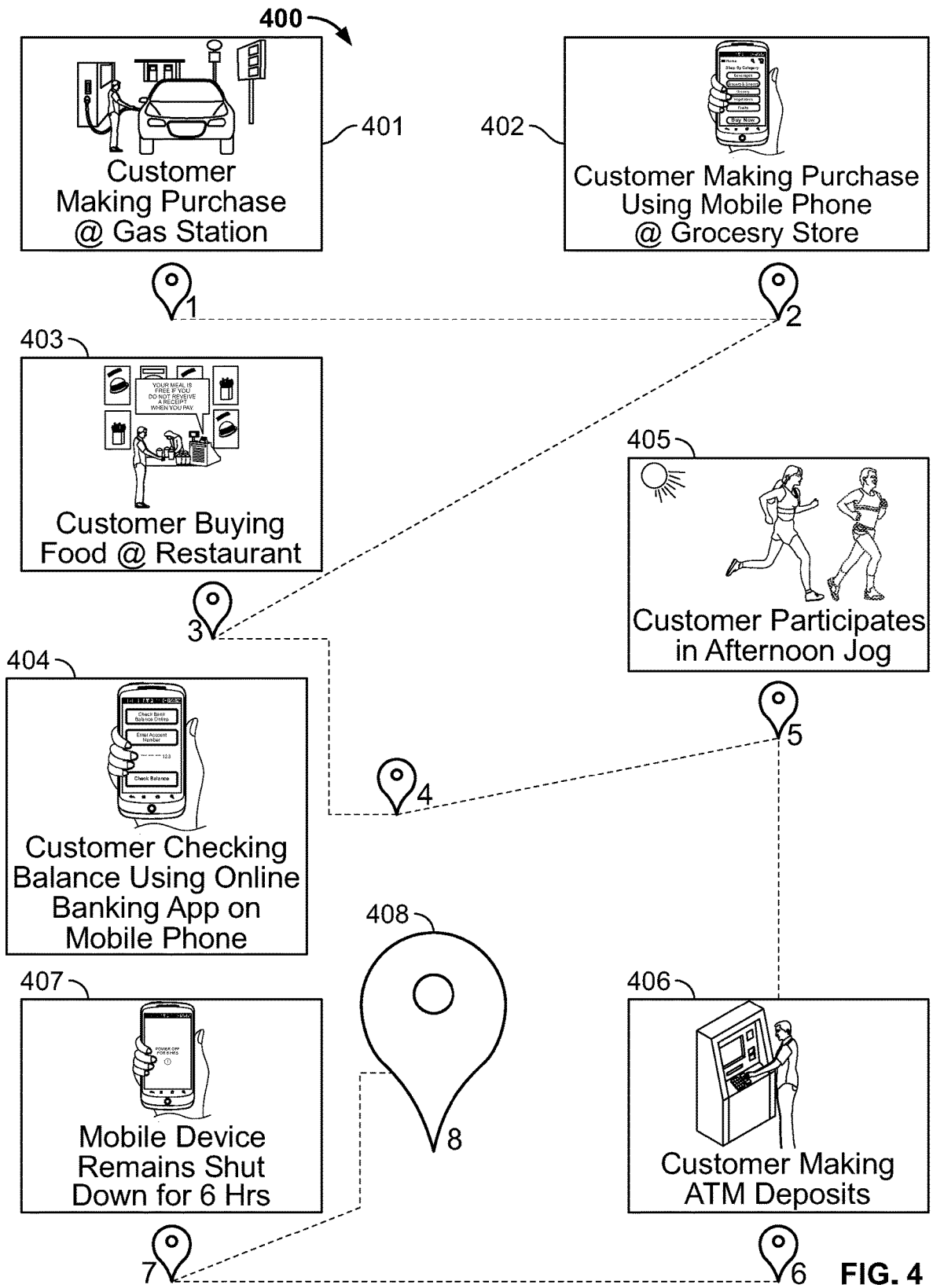
FIG. 4 shows an illustrative scenario in accordance with principles of the disclosure.

FIG. 4 shows illustrative scenario 400. One or more of the steps illustrated in scenario 400 may be performed by any suitable device. For example, one or more steps of shown in scenario 400 may be performed by devices shown in FIGS. 1-3.

Scenario 400 begins at step 401. At step 401, a customer makes a purchase transaction at a fueling station in location 1. Patronizing the fueling station at location 1 may be an unsolicited authenticator. A value of fuel purchased at the fueling station may be an unsolicited authenticator.

At step 402, the customer purchases products from a grocery store at location 2. Patronizing the grocery at location 2 may be an unsolicited authenticator. A virtual customer model may indicate that the customer visits the grocery at location 2 after the fueling station. Products purchased at the grocery may be unsolicited authenticators.

At step 403, the customer purchases food from an eatery at location 3. Patronizing the eatery at location 3 may be an unsolicited authenticator. Patronizing the eatery at location 3 at a certain time may be an unsolicited authenticator. For example, a virtual customer model may indicate that the customer visits the eatery during work hours. Location 3 may be with a predetermined distance of a customer's work address.

At step 404, the customer checks an account balance using an online banking ("OLB") application running on a mobile device. Before accessing the OLB application, a customer may be required to successfully authenticate themselves. Such authentication may include submitting a biometric authenticator to a sensor embedded in the mobile device. The mobile device may validate the submitted biometric authenticator before granting access to the OLB application. The OLB application may detect that the customer is in location 4 when the account balance is provided to the customer.

In addition to successful authentication, a location associated with the account balance check may be an unsolicited authenticator. A virtual customer model may indicate that location 4 is along a route typically traveled by the customer between a home address and a work address.

At step 405, the customer performs an exercise routine at location 5. The time when the exercise routine is performed may be an unsolicited authenticator. A jogging route followed by customer may be an unsolicited authenticator.

At step 406, the customer makes a deposit at an ATM in location 6. Before accessing the ATM, customer may be required to successfully authenticate themselves at the ATM. A deposit amount may be an unsolicited authenticator. For example, the customer may deposit an amount corresponding to a paycheck associated with a virtual customer model. At step 407, the customer's mobile device is inaccessible for six-hours while the customer is at location 7. Location 7 may correspond to a known location associated with the customer. For example, location 7 may be a home address of the customer. Location 7 may be an unsolicited authenticator.

Edge-nodes may perform a plurality of pre-authentication routines based on unsolicited authenticators or any activity of a customer. Edge-nodes may determine a threshold pre-authentication of the customer based on captured unsolicited authenticators. Edge-nodes may leverage the threshold pre-authentication to provide the customer access to a product or service at step 408.

Edge-nodes may determine that steps 401-407 have been performed by the customer a threshold number of times. Authenticators associated with steps 401-407 may be included in a virtual customer model. Edge-nodes may determine that when authenticators associated with steps 401-408 are captured, they provide pre-authentication of the customer. Based on a successful pre-authentication, when the customer arrives at location 8 and attempts to access a product or service, the edge-nodes may provide access to a product via a contactless authentication routine or an abbreviated real-time authentication routine.

FIG. 5 shows illustrative authenticators 500 generated by the scenario shown in FIG. 4. Authenticators 501 show that at location 1, the customer purchases fuel using a known payment instrument, at a known location from a known vendor. A "known" authenticator may correspond to an authenticator that has been associated with the customer a threshold number of times. Known authenticators may indicate that a customer is following a behavior pattern or generating authenticators associated with a virtual customer model.

Authenticators 503 show that at location 2, the customer paid for groceries using a mobile device, using a known payment instrument at a known vendor. Authenticators 503 also indicate that the customer made the purchase an unknown location. For example, the vender may operate a chain of retail locations. The customer may have patronized the vendor using a retail location that has not been visited by the customer a threshold number of times. Edge-nodes may monitor purchases at the location and determined if/when the number of purchases meets the threshold number. When the number of purchases meets the threshold number, the edge-nodes may update a virtual customer model associated with the customer by adding the location as a known authenticator.

Authenticators 505 show that at location 3, the customer purchased food at the eatery using a known payment method. Authenticators 505 also show that the location and vendor are unknown.

Authenticators 507 show that at location 4, the customer checked the account balance at a known location using known device. A device may be known based on a unique identifier, such as media access control ("MAC") address, international mobile equipment identity ("IMEI") or mobile equipment identifier ("MEID") associated with the device and known to be have been used by the customer a threshold number of times. The device identifier may be a known authenticator associated with a virtual customer model.

Authenticators 509 show that at location 5, the customer jogged at a known location. Authenticators 509 also show that the customer generated known bioinformatics while exercising at location 5. Known bioinformatics may include authenticators such as heartrate and pulse expected for the customer. Known bioinformatics may include authenticators expected based on the terrain (e.g., hilly, flat) of location 5 and weather (e.g., hot, cold, rainy) at location 5.

Authenticators 511 show that at location 6, the customer presented a known device (e.g., mobile device, payment instrument) to access the ATM of a known vendor. However, authenticators 511 also indicate that the customer visited an ATM at an unknown location. Authenticators 513 show that at location 7, the customer device remained off in a known location.

Based, collectively, on authenticators 500, when the customer approaches an ATM at location 8, the customer may be granted access to the ATM based on touchless or contactless authentication routine. Such an authentication routine may be facial recognition alone. The customer may not be required to present a tangible item or enter a PIN to gain access to the ATM at location 8.

Figure 6:
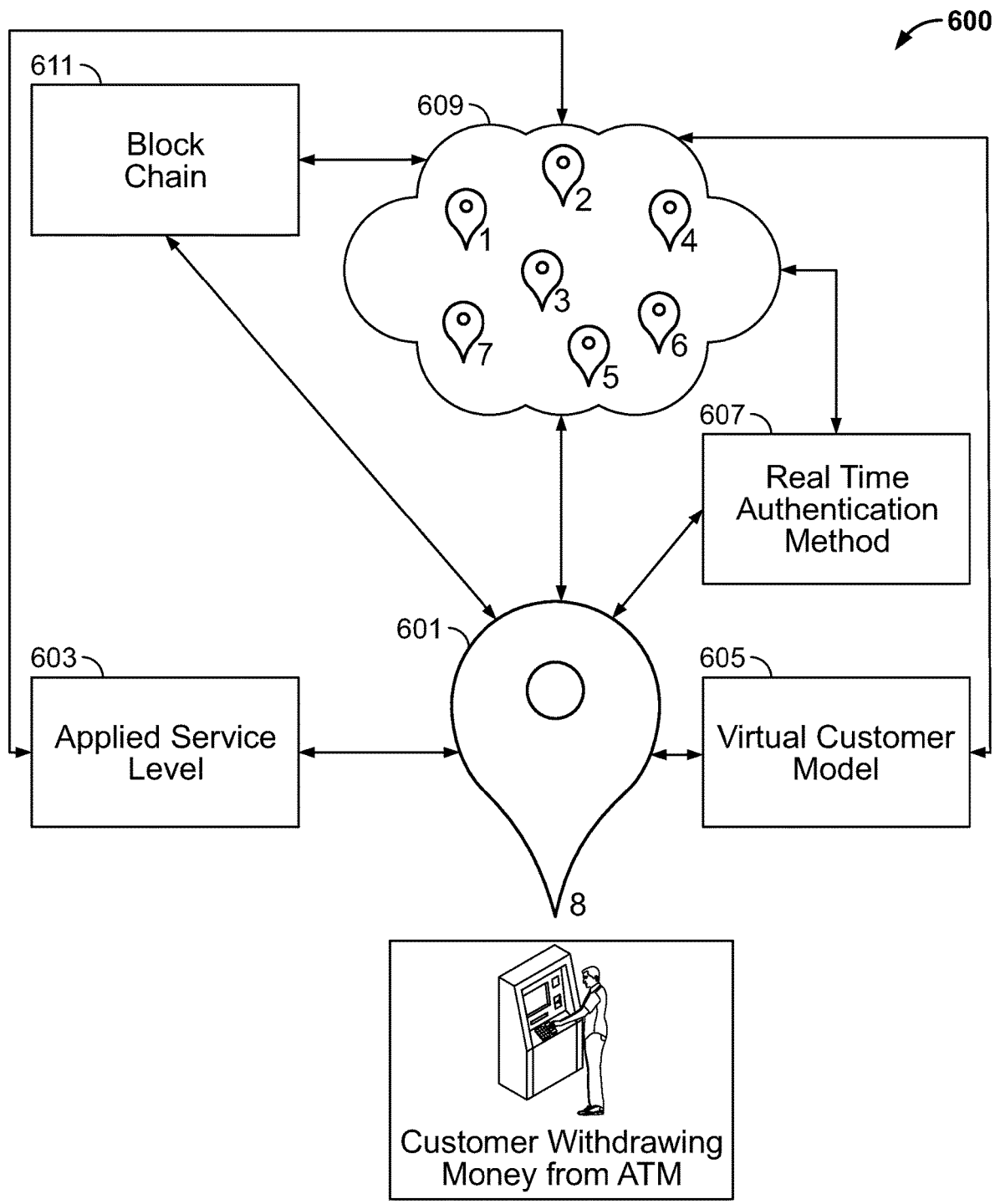
FIG. 6 shows an illustrative application of the authenticators generated by the scenario shown in FIG. 4.

FIG. 6 shows an illustrative application 600 of authenticators generated by the scenario shown in FIG. 4. Application 600 shows that authenticators 609 associated with locations 1-7 (shown in FIG. 4) may be recorded in blockchain 611. Real time authentication method 607 may be generated based on authenticators 609. Applied service level 603 may also be generated based on authenticators 609.

At 601, real time authentication method 607 may be utilized by the customer to gain access to the ATM at location 8. In response to real time authentication method 607, the ATM may provide the customer with applied service level 603. A virtual customer model may be updated based on authenticators 609. The virtual customer model may be updated based on behavior of the customer when accessing the ATM at 601 using real-time authentication method 607.

Figure 7:
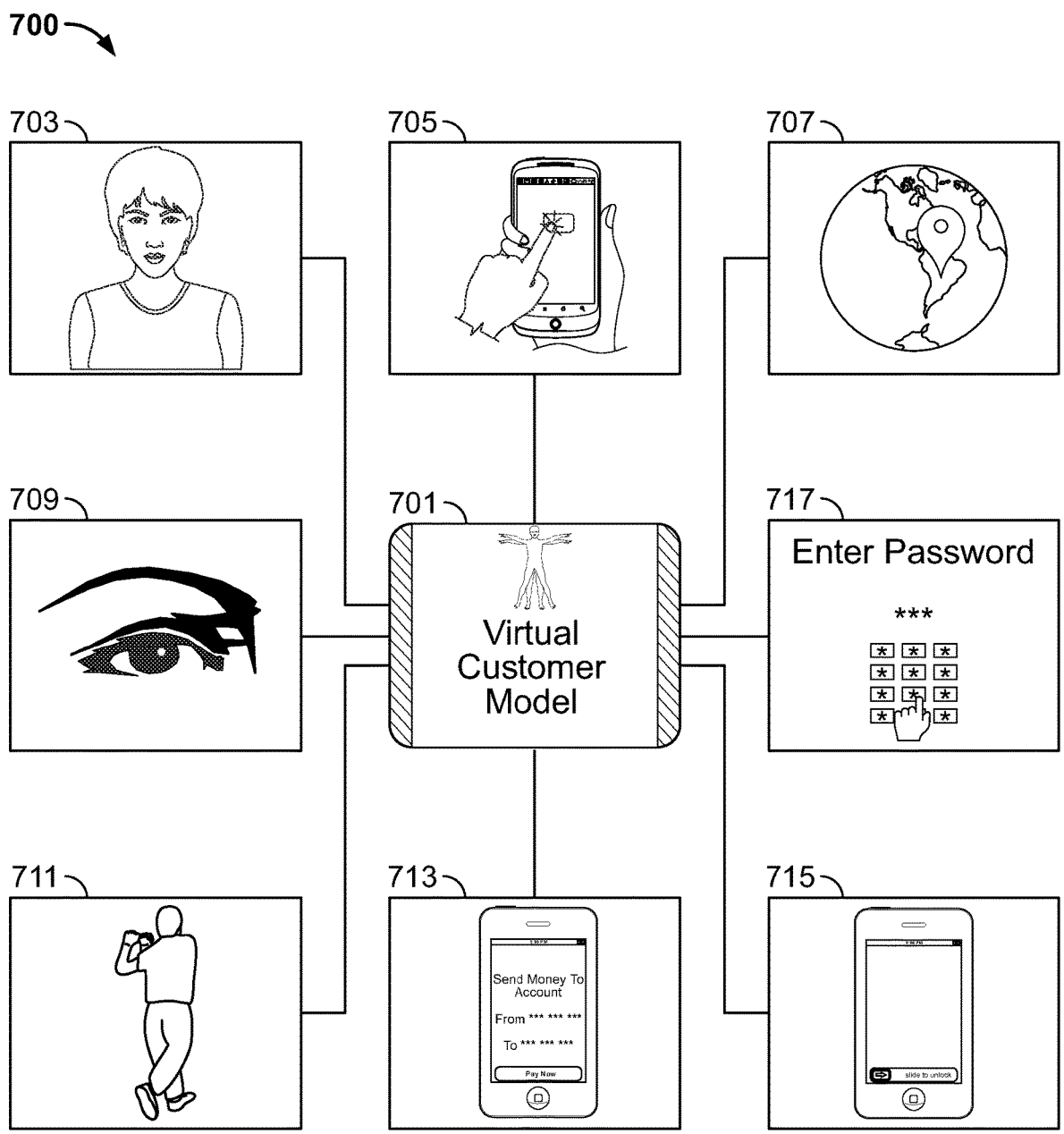
FIG. 7 shows an illustrative system in accordance with principles of the disclosure.

FIG. 7 shows illustrative system components 700. System components 700 may be used to capture solicited and unsolicited authenticators. System components 700 may be used to implement an authentication routine. Data captured by system components 700 may establish a threshold pre-authentication of the customer.

System components 700 include virtual customer model 701. Virtual customer model 700 may be determined by one or more edge-nodes based on analysis of authenticators captured by nodes. Illustrative captured authenticators may include facial recognition scans 703, fingerprint scans 705, location detections 707, retina scans 709, password entries 717, mobile device communication and identifiers 715, transactional behavior 713 and kinesiology information 711.

Thus, apparatus and methods for EDGE-NODE TOUCHLESS AUTHENTICATION ARCHITECTURE are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A self-authenticating automated teller machine ("ATM") system comprising:
  a plurality of edge-nodes that processes a first plurality of unsolicited authenticators of a customer captured over a first predefined time interval, wherein:
    the plurality of edge-nodes comprises a smartphone, a smartwatch, a point-of-sale ("POS") terminal, an automobile and a personal computer;
    the first plurality of unsolicited authenticators comprises video stream data, biometric data and geographic location data; and
    each of the unsolicited authenticators are not presented by the customer in response to a customer-initiated request for access to a secure service;
  a cloud computing environment that generates a virtual customer model based on the first plurality of unsolicited authenticators, wherein the virtual customer model identifies unsolicited authenticator patterns that define the customer;
  the plurality of edge-nodes performs a plurality of pre-authentication routines that determine whether a second plurality of captured unsolicited authenticators of the customer captured over a second predefined time interval conform to the virtual customer model;
  a consensus protocol that establishes a threshold service level provided to the customer based on results of the plurality of pre-authentication routines; and
  an ATM that:
    detects a presence of the customer within a predetermined distance of the ATM;
    based on the results of the plurality of pre-authentication routines, provides the customer access to the threshold service level at the ATM when the customer executes a contactless authentication routine at the ATM within a predetermined time window, wherein the predetermined time window is determined based on the predetermined distance and the contactless authentication routine does not require the customer to present a tangible item or enter a PIN to gain access to the ATM; and denies the customer access to the ATM when the customer does not execute the contactless authentication routine at the ATM within the predetermined time window.

2. The self-authenticating ATM system of claim 1, wherein the threshold service level is a first threshold service level, the ATM further configured to:

generate a real-time authentication routine based on the results of the pre-authentication routines; and execute the real-time authentication routine before providing the customer access to a second threshold service level.

3. The self-authenticating ATM system of claim 2, wherein the real-time authentication routine is based on solicited authenticators of the customer.

4. The self-authenticating ATM system of claim 3, wherein the first threshold service level restricts functionality of the ATM relative to the second threshold service level.

5. The self-authenticating ATM system of claim 1:

at least one of the plurality of edge-nodes is configured to determine a desired ATM product before the customer accesses the ATM;

the ATM is further configured, based on the desired ATM product and the results of the pre-authentication routines, to:

generate a real-time authentication routine;

communicate the real-time authentication routine to the customer;

receive authenticators responsive to the real-time authentication routine before the customer arrives at the ATM; and provide the customer access to the desired ATM product using the contactless authentication routine.

6. The self-authenticating ATM system of claim 1, wherein the plurality of edge-nodes is configured to establish the threshold service level based on matching, to the virtual customer model, a threshold number of:

facial recognition scans;
geographic location correlations;
fingerprint recognition scans; and
transactional activities.

7. The self-authenticating ATM system of claim 1, wherein computing power for executing the consensus protocol is provided by the plurality of edge-nodes.

8. A method for self-authenticating a customer at an automated teller machine ("ATM"), the method comprising:

capturing a first plurality of unsolicited authenticators of a customer, wherein the first plurality of unsolicited authenticators comprises video stream data, geographic location data, biometric data and purchase activity;

using a cloud computing environment, generating a virtual customer model based on the first plurality of unsolicited authenticators of the customer, wherein the virtual customer model identifies unsolicited authenticator patterns that correspond to the customer;

using a plurality of edge-nodes comprising a smartphone, a smartwatch, a point-of-sale ("POS") terminal, an automobile and a personal computer:

capturing a second plurality of unsolicited authenticators of the customer; and performing a plurality of pre-authentication routines based on the second plurality of unsolicited authenticators of the customer, wherein the pre-authentication routines determine whether the second plurality of unsolicited authenticators conform to the virtual customer model and therefore correspond to activity of the customer;

after performing the plurality of pre-authentication routines, executing a consensus protocol and establishing a threshold service level and an abbreviated real-time authentication routine for the customer;

capturing a third plurality of unsolicited authenticators responsive to the abbreviated real-time authentication routine; and detecting a presence of the customer within a predetermined distance of the ATM;

after the capturing of the third plurality of unsolicited authenticators, providing the customer access to the ATM at the threshold service level when a contactless authentication routine is executed within a predetermined time window wherein the predetermined time window is determined based on the predetermined distance and the contactless authentication routine does not require the customer to present a tangible item or enter a PIN to gain access to the ATM; and denying the customer access to the ATM when the execution of the contactless authentication routine occurs outside the predetermined time window;

wherein the first, second and third plurality of unsolicited authenticators comprise activity of the customer that is not taken by the customer in response to a customer-initiated request for access to the ATM.

9. The method of claim 8, wherein:

the plurality of pre-authentication routines provides a first authentication factor; and the abbreviated real-time authentication routine provides a second authentication factor.

10. The method of claim 8 further comprising, executing the consensus protocol using computing power provided by the cloud computing environment.

11. The method of claim 8 further comprising recording a result of each pre-authentication routine in a distributed ledger.

12. The method of claim 8, wherein the abbreviated real-time authentication routine comprises facial recognition and does not require the customer to enter a personal identification number to access the ATM.

13. A self-authenticating automated teller machine ("ATM") system comprising:

an ATM configured to:

provide a customer access to an ATM product based on a two-factor real-time authentication routine;

capture a first set of unsolicited authenticators of the customer the first set of unsolicited authenticators comprising video stream data, geographic location data, biometric data and purchase activity that are not captured in response to a customer-initiated request for access to the ATM; and based on the first set of captured unsolicited authenticators, generate a plurality of pre-authentication routines configured to capture a second set of unsolicited authenticators;

a plurality of edge-nodes configured to perform the plurality of pre-authentication routines and authenticate the second set of captured unsolicited authenticators; and a cloud computing environment configured to:

generate a virtual customer model based on the first set of captured unsolicited authenticators wherein the virtual customer model identifies unsolicited authenticator patterns that correspond to the customer;

configure each of the plurality of edge-nodes to validate a threshold number of the pre-authentication routines based on whether the second set of unsolicited authenticators conform to the virtual customer model;

in response to validating the threshold number of pre-authentication routines, reconfigure the ATM to provide the customer contactless access to the ATM at a threshold service level, wherein, the contactless access does not require the customer to present a tangible item or enter a PIN to gain access to the ATM; and deny the customer access to the ATM when the validating of the threshold number of pre-authentication routines occurs outside a predetermined time window.

14. The system of claim 13 wherein each of the plurality of edge-nodes are configured to capture one or more of the unsolicited authenticators.

15. The system of claim 13, wherein the cloud computing environment is configured to validate the threshold number of pre-authentication routines based on a consensus protocol running on each of the plurality of edge-nodes.

* * * * *